United States Patent
Cottle

[15] 3,692,859
[45] Sept. 19, 1972

[54] HYDROGENATION OF OXIDATIVE DEHYDROGENATION BY-PRODUCT

[72] Inventor: John E. Cottle, c/o Phillips Petroleum Company, Bartlesville, Okla. 74003

[22] Filed: March 13, 1970
[21] Appl. No.: 19,265

[52] U.S. Cl. ..........260/680 E, 203/32, 260/346.1 R
[51] Int. Cl. ............................C07c 5/18, C07d 5/02
[58] Field of Search .......260/680 E, 346.1 R; 203/32

[56] References Cited

UNITED STATES PATENTS

| | | |
|---|---|---|
| 2,991,320 | 7/1961 | Hearne et al. ..............260/680 |
| 3,320,329 | 5/1967 | Nolan ........................260/680 |
| 2,725,344 | 11/1955 | Fenske et al............260/346.1 |
| 3,518,284 | 6/1970 | Foster....................260/680 X |
| 3,238,225 | 3/1966 | Brill et al. ..............260/346.1 |
| 2,846,449 | 8/1958 | Banford et al. .........260/346.1 |

Primary Examiner—Paul M. Coughlan, Jr.
Attorney—Young and Quigg

[57] ABSTRACT

A by-product stream containing oxygenated hydrocarbons including furan resulting from hydrocarbon oxidative dehydrogenation processes is upgraded in value and rendered readily separable from residual close-boiling hydrocarbons remaining in the by-product stream by subjecting the by-product stream to hydrogenation to convert furan to tetrahydrofuran and then separating the resulting tetrahydrofuran by fractionation from the hydrogenation effluent.

5 Claims, 1 Drawing Figure

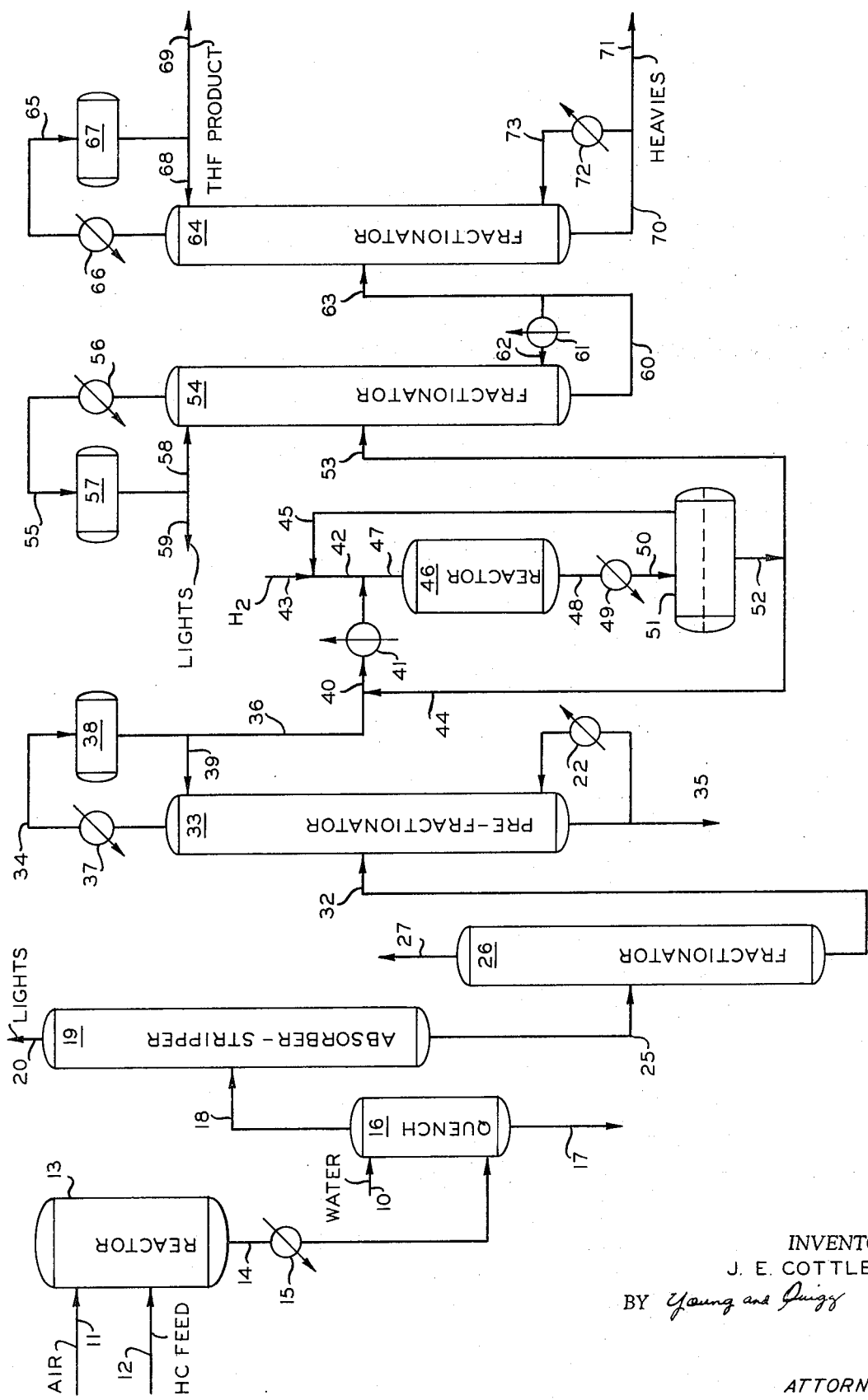

HYDROGENATION OF OXIDATIVE DEHYDROGENATION BY-PRODUCT

BACKGROUND OF THE INVENTION

This invention relates to the purification and separation of a by-product stream obtained as an effluent from an oxidative dehydrogenation process. In accordance with another aspect, this invention relates to the hydrogenation of a by-product stream obtained from an oxidative dehydrogenation process obtaining oxygenated compounds including furan, which is difficultly separable from associated close-boiling hydrocarbons including acetylenes and dienes, to convert the furan to tetrahydrofuran which is readily separable by fractionation. In accordance with a further aspect, this invention relates to the oxidative dehydrogenation of hydrocarbon followed by the separation of unconverted dehydrogenatable hydrocarbon and dehydrogenated product, e.g., butadiene, leaving a narrow-boiling, heavy fraction containing furan, butyne-2, 2-pentene, piperylenes, and isoprene, hydrogenating this narrow-boiling, heavy fraction to convert the furan to tetrahydrofuran and fractionating from the hydrogenation effluent a high purity tetrahydrofuran product.

It is conventional in the petroleum industry to catalytically dehydrogenate n-butane over a catalyst such as iron oxide deposited on an alumina base or carrier to produce an effluent comprising butenes and butadiene. The resulting effluent with or without intermediate separation steps is then subjected to further dehydrogenation in contact with a butene dehydrogenation catalyst to convert the butenes to butadiene, the latter being separated as a product.

A conventional catalyst for butene dehydrogenation comprises iron oxide, chromium oxide, and an alkali metal carbonate, such as potassium carbonate. Operation with this catalyst in the presence of relatively large concentrations of steam promotes the water-gas reaction and maintains the catalyst substantially free of carbonaceous deposits as long as there is an effective concentration of the carbonate present in the catalyst.

In a more recent butene dehydrogenation process known as oxidative dehydrogenation, an oxygen-containing gas is fed to the catalytic reaction zone containing a catalyst such as stannic phosphate along with the butene feed and steam, and a substantial portion of the hydrogen produced by dehydrogenation is combusted to water vapor. This not only removes the inhibiting effect of the hydrogen on further dehydrogenation, but also supplies heat to this endothermic reaction resulting in high conversions and per-pass yield of butadiene at relatively good selectivity. By this method, additional steam is produced which is recovered from the process effluent as condensate. Also, moderate concentrations of oxygenated hydrocarbons are generated which similarly appear in the condensed steam and/or in the hydrocarbon effluent.

A highly reactive dehydrogenation catalyst comprising tin phosphate has recently been disclosed and claimed by Nolan in U.S. Pat. No. 3,320,329. As is set forth in that patent, compounds to be dehydrogenated, preferably selected from the group consisting of alkenes, cycloalkenes, alkylpyridenes and alkyl aromatics, are mixed with oxygen or an oxygen-containing gas, preheated, and passed over a catalyst comprising stannic phosphate at a temperature in the range of 700° to 1,300° F. Generally, the inlet temperature of the gas is around 800° to 900° F.

The oxygen used in the dehydrogenation is present in an excess in order to insure complete conversion of hydrogen released in the dehydrogenation reaction. Therefore, the effluent from the dehydrogenation reaction will contain unreacted oxygen gas as well as a number of oxygenated products of the reaction. This residual oxygen and the oxygenated compounds are corrosive and are subject to polymerization and are therefore detrimental to the further processing of the hydrocarbon product. It is therefore necessary that the oxygen and oxygen-containing compounds be removed from the effluent streams.

It has been found that a small percentage of the olefin feed is converted to oxygenated hydrocarbons such as furan, alcohols, acids, aldehydes, ketones, etc., the nature and quantity of these compounds depending upon the conditions under which the dehydrogenation is effected. Under normal plant operating conditions, these oxygenated by-products will be ultimately fed into the atmosphere and/or discharged with waste water and/or end up in a heavy hydrocarbon-containing fraction, depending upon the separation and recovery processes employed and their operating conditions.

The present invention is directed to the purification from a narrow-boiling fraction comprising furan and residual close-boiling hydrocarbons remaining following separation of the oxidative dehydrogenation effluent whereby the furan is upgraded to a more valuable product, which product is readily separable from the other materials present in the narrow-boiling fraction.

Accordingly, an object of this invention is to provide an improved process for the oxidative dehydrogenation of hydrocarbons.

Another object of this invention is to provide a process for the removal of oxygen-containing compounds from oxidative dehydrogenation effluents.

A further object of this invention is to provide a process for the purification of hydrocarbon streams containing oxygen-containing compounds including furan.

A further object of this invention is to provide a process for rendering narrow-boiling fractions readily separable by fractionation.

Other objects and aspects, as well as the several advantages of the invention, will be apparent to those skilled in the art upon reading the specification, the drawing and the appended claims.

SUMMARY OF THE INVENTION

In accordance with the invention, a narrow-boiling fraction containing furan and close-boiling hydrocarbons including acetylenes and dienes is rendered readily separable by fractionation by subjecting the narrow-boiling fraction to hydrogenation to convert the furan to tetrahydrofuran.

In accordance with one embodiment of the invention, a heavy bottoms phase which is a narrow-boiling fraction containing furan, butyne-2, 2-pentene, piperylenes, and isoprene is subjected to hydrogenation to convert the furan to tetrahydrofuran and the effluent from the hydrogenation is subjected to fractionation to recover as product a high purity tetrahydrofuran stream.

In accordance with a further specific embodiment of the invention, the effluent from a butenes oxidative dehydrogenation is first subjected to fractionation to recover unconverted butenes and butadiene product, leaving a heavy bottoms phase which is a narrow-boiling fraction containing furan, butyne-2, 2-pentene, piperylenes, and isoprene, the latter stream being subjected to fractionation to remove as bottoms heavy materials, and the overhead comprising furan, butyne-2, 2-pentene, piperylenes, and isoprene is subjected to hydrogenation, the effluent from the hydrogenation being separated into a liquid and gaseous phase, the liquid phase being subjected to two-stage fractionation wherein low-boiling impurities are rejected overhead in the first stage and a high purity tetrahydrofuran is recovered overhead from the second stage, and the remaining heavy materials as bottoms from the second fractionation.

DESCRIPTION OF THE PREFERRED EMBODIMENTS

In carrying out the invention, hydrocarbons are dehydrogenated in the presence of oxygen with the result that a minor amount of hydrocarbon feed is converted to oxygenated derivatives thereof to produce an effluent comprising reactant hydrocarbons, dehydrogenated hydrocarbons, oxygenated hydrocarbons and water. The reactant hydrocarbons and dehydrogenated hydrocarbons are separated from the remainder of the mixture leaving a water phase containing some oxygenated hydrocarbons and a hydrocarbon phase containing furan, the latter being a narrow-boiling fraction which also contains compounds having overlapping boiling points such as butyne-2, isoprene, 2-pentene, piperylenes, and n-pentane.

The following tabulation of boiling points for the components of the narrow-boiling fraction illustrates the difficulty in recovering any of the components in a state of high purity by ordinary fractionation:

| Component | Boiling Point, °F |
|---|---|
| Isopentane | 82.1 |
| Butyne-2 | 80.6 |
| Furan | 89.6 |
| Isoprene | 93.3 |
| n-Pentane | 96.9 |
| Pentene-2 | 98 |
| 3-Methylbutadiene-1,2 | 104 |
| cis-Piperylene | 111.6 |
| trans-Piperylene | 108.1 |
| Tetrahydrofuran | 151 |

Furan is actually more difficult to fractionate from admixture with the components listed above than the boiling points illustrate because the components do not form an ideal solution, i.e. the volatilities of the components may be increased or decreased in the presence of the other components thus leading to 2 or more components which form constant-boiling mixtures. It is apparent, however, that tetrahydrofuran is more easily fractionated from the listed hydrocarbons.

The compounds most suitable for use in the process of oxidative dehydrogenation are compounds selected from the group consisting of alkenes, cycloalkenes, alkylpyridines and alkyl aromatics. These compounds are dehydrogenated at relatively high conversion and selectivity rates with and without the use of steam. Hydrocarbons that can be oxidatively dehydrogenated preferably according to the process include those having two to 12 carbon atoms as represented by propane, butane, butene, pentane, pentene, hexane, hexene, etc. Of special interest is the dehydrogenation of butenes to butadiene and the dehydrogenation of isoamylenes to isoprene. Catalysts that can be employed include stannic phosphate, iron stannate or stannite, tin-aluminum phosphate, etc. The amount of oxygen (air can be used) employed during this dehydrogenation ordinarily will be in the range of 0.1 to 3 volumes per volume of gaseous hydrocarbon feed. The amount of steam added to the feedstock passed to the dehydrogenation reactor will be in the range of 0.1 to 150 volumes per volume of gaseous hydrocarbon. The temperature for dehydrogenation will ordinarily be in the range of 800° to 1,200° F. The presently preferred hydrocarbons for dehydrogenation are the C4 and C5 hydrocarbons, essentially the butenes and isoamylenes. The oxidative dehydrogenation process is well known in the art and is described in detail in U.S. Pat. No. 3,320,329.

A better understanding of the invention will be obtained upon reference to the accompanying drawing which illustrates a preferred embodiment of the invention in combination with the processing following butenes oxidative dehydrogenation.

Referring to the drawing, air by line 11 and hydrocarbon feed by line 12 are introduced into oxidative dehydrogenation reactor 13. The conditions for carrying out oxidative dehydrogenation are set forth above and are described in detail in U.S. Pat. No. 3,320,329.

The oxidative dehydrogenation effluent comprising unreacted hydrocarbons, dehydrogenated hydrocarbons, oxygenated hydrocarbons, steam, oxygen and nitrogen is removed from reactor 13 via pipe 14 and partially cooled, for example from 1,125° to about 400° F., by passage through heat exchanger 15 wherein it boils water to form steam. The gaseous effluent from exchanger 15 is additionally cooled to about 240° F. by passage through water quench zone 16 to which cold water is passed via pipe 10. An aqueous phase containing a predominance of the heavier oxygenated hydrocarbons contained in the reactor effluent is removed from zone 16 by way of pipe 17. The remaining bulk of the reactor effluent, still in the gaseous state, is passed to separation zone 19 which consists of a conventional mineral seal oil absorption and stripping steps as illustrated in more detail in U.S. Pat. No. 2,963,522. The oil absorber serves to separate the light gases such as oxygen, nitrogen (from the air passed to reactor 13), methane, hydrogen, etc. from the heavier hydrocarbons and oxygenated compounds by selective absorption of the latter in the oil. The light gases are thus rejected via pipe 20 while the heavier hydrocarbons and oxygenated compounds are passed via pipe 25 to fractionator 26.

A stream consisting essentially of butadiene and unreacted butenes is removed overhead from fractionator 26 via pipe 27 and sent to additional steps for recovering the butadiene product. Bottoms from fractionator 26 consist of furan, isoprene, piperylenes, pentene-2, and heavier hydrocarbons and oxygenated compounds and is passed via pipe 32 to fractionator 33 for removal of the heavier components. Fractionator 33 is operated with sufficient reflux and contacting trays that the overhead stream 34 is composed of a narrow-boiling fraction containing principally furan, isoprene, butyne-2, piperylenes, and pentene-2.

A suitable upper temperature in fractionation zone 33 is about 100° F. with a bottoms temperature of about 220° F. and a column pressure of about 25 psig. A heavy bottoms fraction comprising some furan, but mostly heavier material, is removed by way of line 35 and passed to storage or other suitable use. A portion of the bottoms stream 35 is passed through reboiler 22 and reintroduced into a lower portion of column 33 as a source of heat.

The overhead fraction in line 34 is passed through condenser 37 and thence to accumulator 38. A portion of the condensate removed from accumulator 38 is passed as reflux by way of line 39 to an upper portion of column 33.

The remainder of the condensate comprising furan and close-boiling hydrocarbons removed from accumulator 38 is passed by way of line 36 through pre-heater 41 and introduced into line 42 for introduction into hydrogenation reaction zone 46. Fresh hydrogen which can be either pure hydrogen or a hydrogen-containing stream is introduced into line 42 by way of line 43 at about the hydrogenation reaction zone temperature. Also introduced into 42 is a vaporous recycle stream containing hydrogen obtained from the effluent of the hydrogenation reaction zone 46. Additionally, a portion of the liquid recovered from the hydrogenation effluent is recycled to feed line 40 by way of line 44 for temperature control.

Hydrogenation reaction zone 46 in the specific embodiment is operated at an inlet temperature of about 200° F. and 225 psia and an outlet temperature of about 280° F. The furan introduced into hydrogenation reactor 46 is converted substantially to tetrahydrofuran. The total hydrogenation reactor 46 feed, which includes hydrocarbon obtained from pre-fractionator 33 as well as recycled product and fresh and recycled hydrogen, is introduced by way of line 47 into the reactor.

As indicated above, the hydrogen can be added in the form of pure hydrogen, a hydrogen gas diluted with an inert diluent such as nitrogen, or any other hydrogen-containing gas. Reaction of hydrogen with the oxygen-containing materials, and especially furan, occurs at a temperature of from about 100° to about 400° F., preferably from about 200° to about 300° F., and a pressure of from about 15 to about 1,000 psia, preferably about 100 to about 300 psia. The temperature, of course, depends on whether a catalyst is employed and the type of catalyst employed, if any.

The hydrogen addition can be conducted without catalysts, but metal catalysts containing metal atoms of cobalt, chromium, copper, iron, molybdenum, nickel, palladium, platinum, rhenium, rhodium or zinc can be used with suitable supporting or diluting materials such as alumina, carbon, silica or other similar materials.

The hydrogenation effluent which comprises principally hydrogen, butane, isopentane and tetrahydrofuran is removed by way of line 48, cooled by heat exchanger 49 and passed by way of line 50 to product separator 51. Uncondensed materials including hydrogen removed from the hydrogenation effluent are separated from product separator 51 and returned to hydrogenation reactor 46 as recycle by way of line 45. The product separator can be operated at a temperature of about 100° F. and 210 psia in the embodiment described. Product liquid which comprises tetrahydrofuran, isopentane and butane and a small amount of hydrogen and other materials is removed from separator 51 by way of line 52. A portion of this liquid product removed by line 52 is recycled by way of line 44 as a portion of the feed for hydrogenation reaction zone 46 and is introduced into line 40. The amount of recycle, which stream contains a substantial amount of tetrahydrofuran, is controlled so as to prevent runaway hydrogenation temperatures in zone 46. The ratio of recycle stream 44 to make-up stream 36 is typically in the range of 2 to 10 mols of stream 44 per mol of stream 36, more generally about 5 mols of stream 44 per mol of stream 36.

The remainder of the liquid removed from separator 51 is passed by way of line 53 as feed to fractionation zone 54. Fractionation zone 54 is operated at an upper temperature of about 115° F. and a bottoms temperature of about 200° F. An overhead fraction comprising isopentane and butane is removed overhead by way of line 55, passed through condenser 56 and thence to accumulator 57. A portion of the condensate removed from accumulator 57 is returned as reflux to an upper portion of column 54 by way of line 58. The remainder of the hydrocarbons taken overhead is removed for further use as desired by way of line 59.

A bottoms product comprising principally tetrahydrofuran is removed from the bottom of fractionation zone 54 by way of line 60. A portion of the bottoms product is passed through reboiler 61 and introduced into a lower portion of column 54 by way of line 62 as a source of heat for the column. The remainder of the bottoms product removed from column 54 is passed by way of line 63 to fractionation column 64. Column 64 is operated with an upper temperature of about 195° F. and a bottom temperature of about 205° F.

An overhead fraction comprising tetrahydrofuran is removed by way of line 65, passed through condenser 66 and thence into accumulator 67. A portion of the condensate removed from accumulator 67 is returned as reflux to an upper portion of column 64 by way of line 68 and the remainder, a high purity tetrahydrofuran product, is removed by way of line 69.

A bottoms fraction comprising some tetrahydrofuran and heavier materials is removed from the bottom of column 64 by way of line 70 and passed for further use as desired by way of line 71. A portion of the bottoms stream is passed to reboiler 72 and introduced into a lower portion of column 64 by way of line 73 as a source of heat.

The tetrahydrofuran product recovered overhead from column 64 is about 99 percent pure and as illustrated by the above description it is readily separable from the associated hydrocarbons present in the mixture in which furan is obtained as a by-product from a butenes oxidative dehydrogenation process. The narrow-boiling fraction obtained from the butenes oxidative dehydrogenation contains butyne-2 (boiling point 80.6° F.) and isoprene (boiling point 93.3° F.) in addition to furan (boiling point 89.6° F.). In view of the closeness of the boiling points, it can be readily seen that furan would be very difficult to recover in high purity by ordinary fractionation because of the presence of the close boiling materials. However, in accordance with the invention wherein the furan is converted to tetrahydrofuran (boiling point 151° F.), the tetrahydrofuran is readily separable by conventional fractionation as illustrated by the drawing and as described above.

SPECIFIC EXAMPLE

Utilizing a flow substantially as described above in connection with the accompanying drawing, a close boiling heavy fraction containing furan and various hydrocarbons including acetylene (butyne-2) and diene (isoprene) was obtained from the effluent from a butenes oxidative dehydrogenation. The bottoms product, which was a narrow-boiling mixture, was subjected to fractionation in column 33, hydrogenation in reactor 46 using a hydrogenation catalyst comprising 65 wt percent nickel on Kieselguhr support obtained from Harshaw Chemical Company as catalyst 1404T. The catalyst was activated by passage hydrogen through it at 300° to 400° F. for about 6 hours. The hydrogenation effluent was separated and a liquid product subjected to two-stage fractionation in columns 54 and 64.

Fractionator 33 is 8 inches in diameter and contains 30 feet of ½-inch Raschig rings as fractionation packing. It is operated at 25 psia, a top temperature of 105° F., and a bottom temperature of 223° F.

Fractionator 54 is the same as fractionator 33 in size and fractionation packing and is also operated at 25 psia. It has top temperature of 116° F. and a bottom temperature of 198° F.

Fractionator 64 is 1-foot in diameter and contains 41 feet of ¾-inch Raschig rings as fractionation packing. It operates at a pressure of 25 psia, a top temperature of 197° F., and a bottom temperature of 205° F.

A portion of the product was recycled to the reactor 46 as was hydrogen recovered from the effluent. The flows based on mols per hour for the various components in the various streams are set forth in Table I.

TABLE I

Mols per hour

| Stream No. | 32 | 35 | 36 | 43 | 45 | 42 | 44 | 40 | 47 |
|---|---|---|---|---|---|---|---|---|---|
| Stream component | Column 33 feed | Column 33 KP | Column 33 OHP | Hydrogen | Hydrogen recycle | Combined hydrogen feed | Hydrocarbon recycle | Fresh feed plus recycle | Reactor feed |
| H₂ | | | | 21.3979 | 1.7979 | 23.1958 | 1.4779 | 1.4779 | 24.6737 |
| Methane | | | | .0010 | .0025 | .0035 | .0082 | .0082 | .0117 |
| Butene-2 | .7951 | | .7951 | | | | | .7951 | .7951 |
| n-Butane | 1.4459 | | 1.4459 | | .1151 | .1151 | 11.0385 | 12.4844 | 12.5995 |
| Butadiene | .0580 | | .0580 | | | | | .0580 | .0580 |
| Pentene-1 | .0699 | | .0699 | | | | | .0699 | .0699 |
| Isoprene | .6407 | | .6407 | | | | | .6407 | .6407 |
| Trans-piperylene | .0583 | | .0583 | | | | | .0583 | .0583 |
| Cis-piperylene | .0233 | | .0233 | | | | | .0233 | .0233 |
| Pentene-2 | .0232 | | .0232 | | | | | .0232 | .0232 |
| Isopentane | | | | | .0246 | .0246 | 4.8124 | 4.8124 | 4.8370 |
| n-Pentane | .1630 | | .1630 | | | | | .1630 | .1630 |
| 3-methylbutadiene-1,2 | .0350 | .0001 | .0349 | | | | | .0349 | .0349 |
| Butyne-2 | .0290 | .0002 | .0288 | | | | | .0288 | .0288 |
| Furan | 9.4098 | .2740 | 9.1358 | | .0015 | .0015 | .3285 | 9.4643 | 9.4658 |
| Heavies | 2.8055 | 2.6761 | .1294 | | .0000 | | .0128 | .1422 | .1422 |
| n-Butyl alcohol | | | | | .0002 | .0002 | .6021 | .6021 | .6023 |
| Tetrahydrofuran | | | | | .0563 | .0563 | 43.0128 | 43.0688 | 43.0611 |
| Total mols/hr | 15.5567 | 2.9504 | 12.6063 | 21.3989 | 1.9981 | 23.3970 | 61.2932 | 73.8995 | 97.2966 |
| Total lbs./hr | 1120.83 | 286.81 | 834.02 | 43.15 | 16.31 | 59.46 | 4165.57 | 4999.59 | 5059.05 |

| Stream No. | 48 | 52 | 53 | 59 | 63 | 70 | 69 |
|---|---|---|---|---|---|---|---|
| Stream component | Reactor effluent | Product separator liquid | Column 54 feed | Column 54 OHP | Column 64 feed | Column 64 KP | Column 64 OHP |
| H₂ | 3.5869 | 1.7890 | .3111 | .3111 | | | |
| Methane | .0117 | .0092 | .0010 | .0010 | | | |
| Butene-2 | | | | | | | |
| n-Butane | 13.4815 | 13.3664 | 2.3279 | 2.3279 | | | |
| Butadiene | | | | | | | |
| Pentene-1 | | | | | | | |
| Isoprene | | | | | | | |
| Trans-piperylene | | | | | | | |
| Cis-piperylene | | | | | | | |
| Pentene-2 | | | | | | | |
| Isopentane | 5.8504 | 5.8258 | 1.0134 | 1.0134 | | | |
| n-Pentane | | | | | | | |
| 3-methylbutadiene-1,2 | | | | | | | |
| Butyne-2 | | | | | | | |
| Furan | .3992 | .3977 | .0692 | .0645 | .0047 | .0047 | |
| Heavies | .0155 | .0155 | .0027 | .0000 | .0027 | .0027 | |
| n-Butyl alcohol | .7291 | .7289 | .1268 | .0031 | .1237 | .1207 | .0030 |
| Tetrahydrofuran | 52.1917 | 52.1354 | 9.0666 | .1808 | 8.8858 | .4905 | 8.2953 |
| Total mols/hr | 76.2660 | 74.2679 | 12.9187 | 3.9018 | 9.0169 | .6186 | 8.3983 |
| Total lbs./hr | 5,059.05 | 5,042.74 | 877.17 | 226.71 | 650.46 | 44.90 | 605.56 |

NOTE.—KP=Kettle product.  OHP=Overhead product.

I claim:

1. A process for the oxidative dehydrogenation of dehydrogenatable hydrocarbons which comprises:
   a. contacting $C_4$ and $C_5$ hydrocarbons with an oxygen-containing gas and a dehydrogenation catalyst to produce a reaction effluent comprising dehydrogenated hydrocarbon, unconverted hydrocarbon and oxygenated compounds including furan,
   b. separating dehydrogenated hydrocarbon and unconverted hydrocarbon from said effluent, leaving a heavy bottoms close boiling fraction containing furan and other materials including residual amounts of dehydrogenated hydrocarbon including dienes and acetylenes and unconverted hydrocarbons,
   c. passing said heavy bottoms close boiling fraction obtained in step (b) to a fractionation zone and removing as bottoms a heavy fraction and an overhead fraction comprising furan and diene and acetylene hydrocarbons,
   d. passing said overhead fraction obtained in step (c) to a hydrogenation zone and therein contacting same with hydrogen and a hydrogenation catalyst to convert furan to tetrahydrofuran and dienes and acetylenes to saturated hydrocarbons and produce a hydrogenation effluent comprising tetrahydrofuran, saturated hydrocarbons and hydrogen,
   e. separating hydrogen from said effluent obtained in step (d) and recycling same to the feed to said hydrogenation zone, leaving a liquid phase comprised of saturated hydrocarbons and tetrahydrofuran, and
   f. subjecting said liquid phase obtained in step (e) to fractionation to separate same into saturated hydrocarbon fractions and a separate tetrahydrofuran fraction as product.

2. A process according to claim 1 wherein the liquid phase obtained in step (e) is subjected to two-stage fractionation wherein light saturated hydrocarbons are recovered overhead in the first stage, tetrahydrofuran is recovered overhead in said second stage, and heavy saturated hydrocarbon materials are recovered as bottoms from the second stage.

3. A process according to claim 1 wherein the hydrocarbon to be dehydrogenated is a $C_4$ hydrocarbon-containing feed rich in butenes and wherein the heavy bottoms fraction obtained in step (b) contains, in addition to furan, butyne-2 and isoprene, both of which have boiling points close to that of furan and which are difficultly separatable therefrom by fractionation.

4. A process according to claim 1 wherein the effluent removed from the hydrogenation in step (d) is cooled prior to fractionation to condense liquefiable liquids in the effluent and the cooled effluent is then subjected to gaseous liquid separation wherein the gaseous fraction comprising hydrogen is recycled to the hydrogenation zone and the liquid fraction is subjected to fractionation to separately recover light and heavy saturated hydrocarbons and tetrahydrofuran as product.

5. A process according to claim 4 wherein the fractionation is effected in two stages wherein light saturated hydrocarbons are recovered overhead from the first fractionation stage, tetrahydrofuran is recovered as the overhead from the second fractionation stage, and the heavy saturated hydrocarbons are recovered as bottoms from the second fractionation stage.

* * * * *